United States Patent
Odinaev

(10) Patent No.: US 11,972,011 B2
(45) Date of Patent: Apr. 30, 2024

(54) FACE RECOGNITION USING THE BLOCK CHAIN

(71) Applicant: CORSIGHT.AI, Tel Aviv (IL)

(72) Inventor: Karina Odinaev, Tel Aviv (IL)

(73) Assignee: CORSIGHT.AI. LTD., Tel-Aviv (IL)

( * ) Notice: Subject to any disclaimer, the term of this patent is extended or adjusted under 35 U.S.C. 154(b) by 13 days.

(21) Appl. No.: 17/446,827

(22) Filed: Sep. 2, 2021

(65) Prior Publication Data

US 2022/0067192 A1    Mar. 3, 2022

Related U.S. Application Data

(60) Provisional application No. 63/073,894, filed on Sep. 2, 2020.

(51) Int. Cl.
*G06F 21/00*    (2013.01)
*G06F 21/62*    (2013.01)
*G06V 40/16*    (2022.01)

(52) U.S. Cl.
CPC ........ *G06F 21/6227* (2013.01); *G06F 21/629* (2013.01); *G06V 40/172* (2022.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 8,316,237 | B1* | 11/2012 | Felsher | H04L 9/3249 380/282 |
| 10,931,677 | B1* | 2/2021 | Rose | H04L 63/0861 |
| 2013/0077835 | A1* | 3/2013 | Kritt | G06V 20/30 382/118 |
| 2019/0026450 | A1* | 1/2019 | Egner | G06F 21/44 |
| 2019/0311102 | A1* | 10/2019 | Tussy | G06F 21/34 |
| 2019/0319861 | A1* | 10/2019 | Pan | H04L 9/0637 |
| 2019/0341134 | A1* | 11/2019 | Shah | G16H 10/60 |
| 2020/0014528 | A1* | 1/2020 | Nandakumar | H04L 63/123 |
| 2020/0387896 | A1* | 12/2020 | Tran | H04L 9/3247 |

* cited by examiner

*Primary Examiner* — Maung T Lwin
(74) *Attorney, Agent, or Firm* — Reches Patents

(57) ABSTRACT

There may be provided a method for block chain based facial recognition, the method may include receiving a request, by a controller and from a requesting entity, to utilize a facial recognition service that is block chain based; determining, by the controller, whether to fulfil the request or to reject the request; utilizing the facial recognition service to provide a response to the request and outputting the response when determining to fulfill the request; and rejecting the request when determining to reject the request.

20 Claims, 2 Drawing Sheets

FACE RECOGNITION USING THE BLOCK CHAIN

BACKGROUND

Face visual information and face signatures used to identify said face may be regarded as a highly sensitive information that should not be solely managed by one company.

In addition—the dataset that can be obtained by a single company may be limited in relation to datasets that can be aggregated by multiple companies.

There is a growing need to secure at least one out of face visual information and face signature.

SUMMARY

There may be provided systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
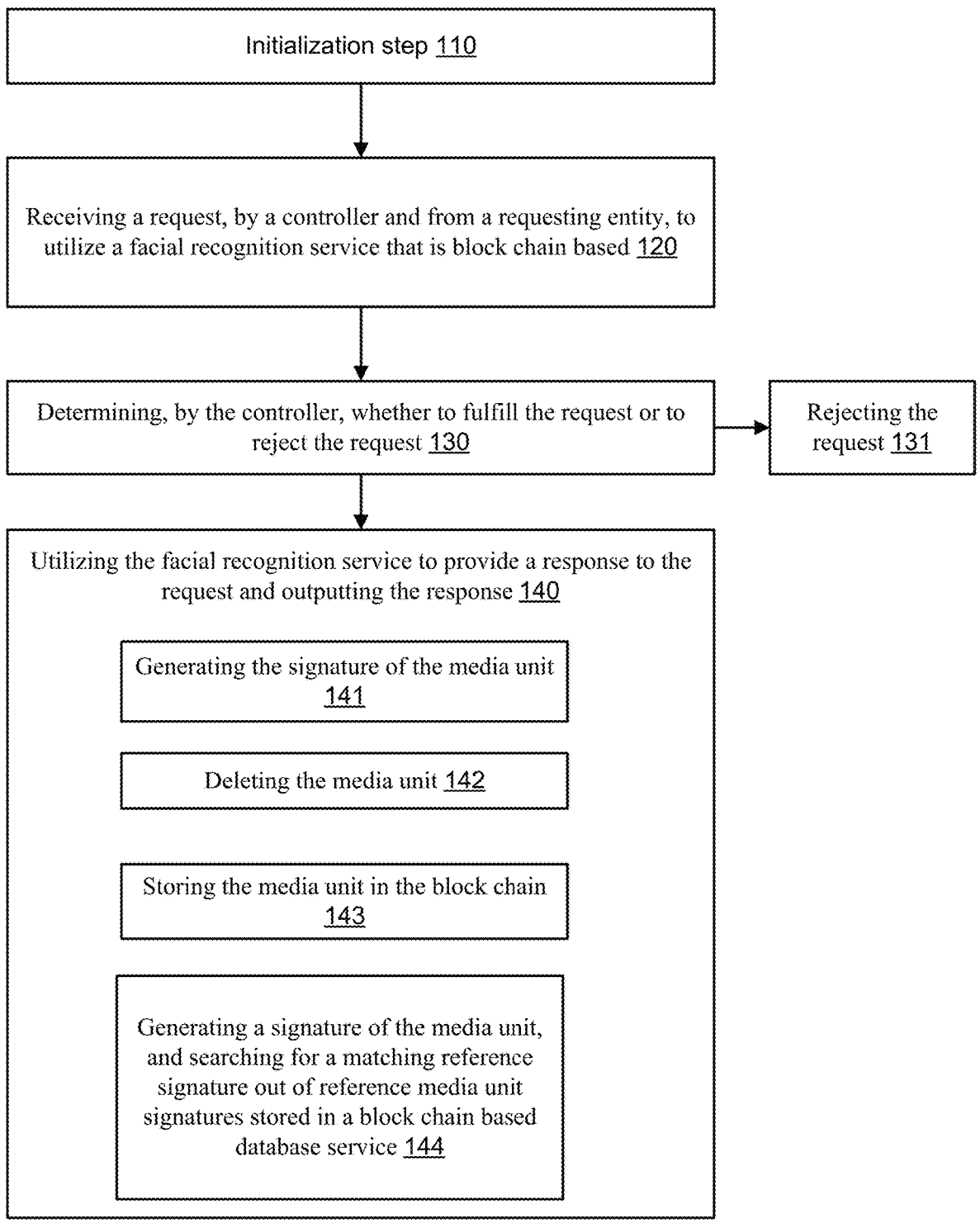
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

There may be provided a method, system and a non-transitory computer readable medium for managing face visual information and face signatures in a distributed manner while applying access control.

The method, system and a non-transitory computer readable medium may use the blockchain which allows encrypted storage of data on a distributed ledger. It allows for the creation of fully secured databases which can be looked into by parties who have been approved to do so. When combining blockchains with AI, we have a backup system for the sensitive and highly valuable personal data of individuals.

The blockchain (also referred to as a block chain), is a growing list of records, called blocks, that are linked using cryptography. Each block contains a cryptographic hash of the previous block, a timestamp, and transaction data (generally represented as a Merkle tree). (See: wikipedia.org).

By design, a blockchain is resistant to modification of the data. It is "an open, distributed ledger that can record transactions between two parties efficiently and in a verifiable and permanent way".

For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Although blockchain records are not unalterable, blockchains may be considered secure by design and exemplify a distributed computing system with high Byzantine fault tolerance. Decentralized consensus has therefore been claimed with a blockchain.

Blockchain networks are usually open and do not require access control. This means that applications can be added to the network without the approval or trust of others, using the blockchain as a transport layer.

Access control to services of the block chain may be applied by defining one or more access control rules in a smart contract and loading the smart contract (which is actually code that implements the smart contract) to the block chain.

FIG. 1 illustrates a method 100 for block chain based facial recognition.

Method 100 may start by an initialization step 110 in which a facial recognition service that is block chain based is established. The facial recognition is block chain based in the sense that a provision of the service requires to access the block chain.

The facial recognition service may be access-protected by a smart contract stored in the block chain, the code for executing one or more facial recognition operation related to the service may be access-protected by a smart contract stored in the block chain, signatures of images may be access-protected by a smart contract stored in the block chain, the code for executing one or more facial recognition operation related to the service may be included in a smart contract stored in the block chain, signatures of images may be stored in the block chain, and the like.

A media unit that may include facial information may be stored in the blockchain. The media unit may be access protected. The media unit may be deleted after the service generates a signature of the media unit. The signature may be maintained in the block chain. The signature may be a lossy signature that does not store the entire information required to reconstruct the media unit.

Step 110 may include generating multiple signatures of multiple reference faces by the service, storing one, some, all or none of the multiple signatures in the block chain, and the like.

Step 110 may be followed by step 120 of receiving a request, by a controller and from a requesting entity, to utilize a facial recognition service that is block chain based. Alternatively, a computerized system may include a man machine interface that may generate following step 120, an indication (human perceivable indication) of a request to a human user, and receive feedback/response from the user of whether to allow access or not (in this case the decision of case 130 may be made by the user, or the controller may base its determination, at least in part on the feedback of the user). The user may provide an indication about whether to allow access not in real time—for example in advance, such as providing the controller an authorization to allow access (may be conditions, limited for duration, limited for a certain purpose, may be limited by number of accesses) in advance, and the like. For example—the user can give a one-time access to a certain party to use their face signatures for a certain purpose. For example company A can use signatures for the purpose of access control, but not for say targeted advertising.

The controller may be a computerized entity that may be configured to execute one or more smart contracts stored in the block chain.

Step 120 may be followed by step 130 of determining, by the controller, whether to fulfil the request or to reject the request.

Step 130 may be based on, at least one or more access control parameter related to the request.

The one or more access control parameter may relate to at least one out of (a) an identity of the requesting entity, (b) a type of the request, (c) a price parameter, and the like.

The access control may be based in various manners. For example using access control methods such as attribute based access control, attribute based encryption access control, fine grained access control, granular attribute based access control, role based access control. See, for example: Sara Rouhani and Ralph Deters "Blockchain based access control systems: State of the art and challenges", Web Intelligence '19, Oct. 14-17, 2019, Thessaloniki, Greece, which is incorporated herein by reference.

When determining to fulfill the request step 130 may be followed by step 140 of utilizing the facial recognition service to provide a response to the request and outputting the response.

When determining to reject the request then step 130 may be followed by step 131 of rejecting the request.

The request to utilize the facial recognition service may include a request to generate a signature of a media unit. Step 140 may include step 141 of generating the signature of the media unit.

The response may be the signature, an indication that a signature was generated, and/or retrieval information for retrieving the signature.

Step 140 may include step 142 of deleting the media unit or step 143 of storing the media unit in the block chain for at least a predefined period and/or storing until a quote of media units (or an aggregate size of media units) reaches a limit.

The request to utilize the facial recognition service may be request to recognize a face that appears in a media unit. Step 140 may include step 144 of generating a signature of the media unit, and searching for a matching reference signature out of reference media unit signatures stored in a block chain based database service. The reference media unit signatures may be arranged in concept structures. If a matching reference signature is found—then the face is the face of the person associated with the matching reference signature.

Examples of generation of signatures and concept structures, and searching for matches between a signature of face within a media unit (or a signature of the entire media unit) and reference signatures are illustrated in U.S. patent application Ser. No. 16/542,327 filing date Aug. 16, 2019, which is incorporated herein by reference.

Step 140 may be based on facial recognition rules set in one or more smart contracts.

Figure 2:
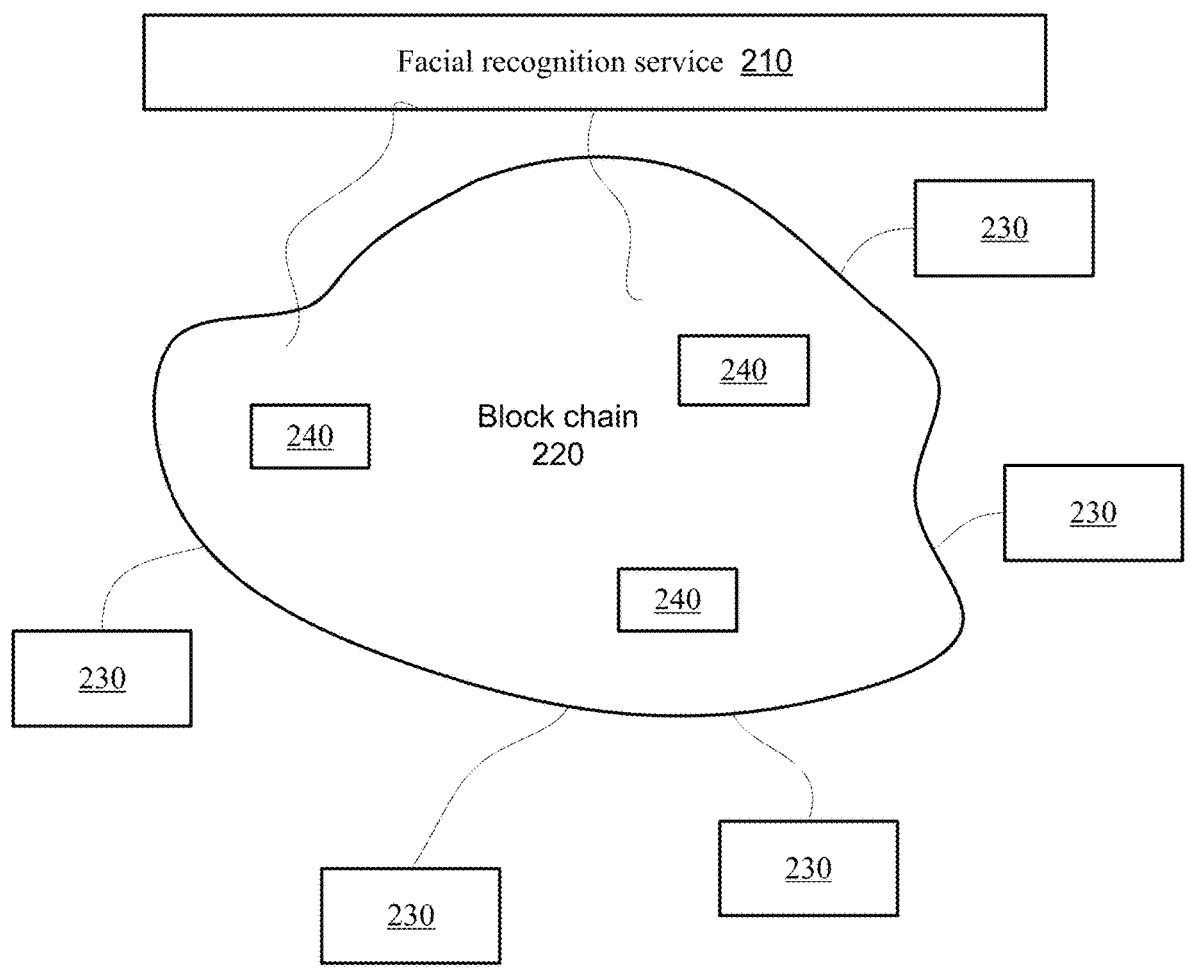
FIG. 2 illustrates an example of a facial recognition service and a block chain.

FIG. 2 illustrate a facial recognition service 210 that is block chain based, the block chain 220, computers 230 that may attempt to access the facial recognition service 210 that is block chain based. The block chain 220 is illustrated as storing smart contracts 240 that may form a part of the facial recognition service or may control access to the facial recognition service. The facial recognition service 210 may be implemented, at least in part by the block chain. The facial recognition service 210 may not belong to the block chain but access via an access control implemented by the block chain.

The block chain may include computers that includes one or more processors, communication means, and storage systems configured to provide the block chain functionality.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for block chain based facial recognition, the method comprises:
   receiving a request, by a controller and from a requesting entity that is a computer, to utilize a facial recognition service that is block chain based;
   determining, by the controller, whether to fulfil the request or to reject the request; wherein the determining is based on one or more access control rules of a smart contract that is loaded to the block chain; wherein the one or more access control rules are related to at least one of (a) an identity of the requesting entity, (b) a purpose of the request, (c) a timing of the request, or (d) a number of accesses of the requesting entity to the facial recognition service;
   utilizing the facial recognition service to provide a response to the request and outputting the response when determining to fulfill the request; and rejecting, by the controller, the request when determining to reject the request wherein the rejecting is followed by not utilizing the facial recognition service;

wherein the controller is a processing circuit that comprises one or more integrated circuits and is configured to execute the smart contract.

2. The method according to claim 1 wherein the request to utilize the facial recognition service comprises a request to generate a signature of a media unit that captures a face; and wherein the utilizing of the facial recognition service to provide the response comprises generating the signature of the media unit.

3. The method according to claim 1 wherein the utilizing of the facial recognition service to provide the response is followed by deleting the media unit.

4. The method according to claim 1 wherein the request to utilize the facial recognition service comprises a request to recognize a face that appears in a media unit; wherein the utilizing of the facial recognition service to provide the response comprises generating a signature of the media unit; searching for a matching reference signature out of reference media unit signatures stored in a block chain based database service.

5. The method according to claim 4 wherein the reference media unit signatures are arranged in concept structures.

6. The method according to claim 1 wherein the purpose of the request is selected out of access control and targeted advertising.

7. The method according to claim 1 wherein the one or more access control rules are related only to a combination of the identity of the requesting entity and the purpose of the request.

8. The method according to claim 1 wherein the one or more access control rules are related only to a combination of the identity of the requesting entity and the timing of the request.

9. The method according to claim 1 comprising fulfilling the request when the request is for utilizing the facial recognition service for access control and rejecting the request when the request is for utilizing the facial recognition service for targeted advertising.

10. The method according to claim 1 wherein the utilizing of the facial recognition service is based on facial recognition rules set in another smart contract.

11. A non-transitory computer readable medium for block chain based facial recognition, the non-transitory computer readable medium stores instructions for:

receiving a request, by a controller and from a requesting entity that is a computer, to utilize a facial recognition service that is block chain based;

determining, by the controller, whether to fulfil the request or to reject the request; wherein the determining is based on one or more access control rules of a smart contract that is loaded to the block chain; wherein the one or more access control rules are related to at least one of (a) an identify of the requesting entity, (b) a purpose of the request, (c) a timing of the request, or (d) a number of accesses of the requesting entity to the facial recognition service that is block chain based;

utilizing the facial recognition service to provide a response to the request and outputting the response when determining to fulfill the request; and rejecting, by the processor, the request when determining to reject the request wherein the rejecting is followed by not utilizing the facial recognition service that is block chain based; and wherein the controller is a processing circuit that comprises one or more integrated circuits and is configured to execute the smart contract.

12. The non-transitory computer readable medium according to claim 11 wherein the request to utilize the facial recognition service comprises a request to generate a signature of a media unit that captures a face; and wherein the utilizing of the facial recognition service to provide the response comprises generating the signature of the media unit.

13. The non-transitory computer readable medium according to claim 12 wherein the utilizing of the facial recognition service to provide the response is followed by comprises deleting the media unit.

14. The non-transitory computer readable medium according to claim 11 wherein the request to utilize the facial recognition service comprises a request to recognize a face that appears in a media unit; wherein the utilizing of the facial recognition service to provide the response comprises generating a signature of the media unit; searching for a matching reference signature out of reference media unit signatures stored in a block chain based database service.

15. The non-transitory computer readable medium according to claim 14 wherein the reference media unit signatures are arranged in concept structures.

16. The non-transitory computer readable medium according to claim 11 wherein the purpose of the request is selected out of access control and targeted advertising.

17. The non-transitory computer readable medium according to claim 11 wherein the one or more access control rules are related only to a combination of the identity of the requesting entity and the purpose of the request.

18. The non-transitory computer readable medium according to claim 11 wherein the one or more access control rules are related only to a combination of the identity of the requesting entity and the timing of the request.

19. The non-transitory computer readable medium according to claim 11 that stores instructions for fulfilling the request when the request is for utilizing the facial recognition service for access control and rejecting the request when the request is for utilizing the facial recognition service for targeted advertising.

20. The non-transitory computer readable medium according to claim 11 wherein the utilizing of the facial recognition service is based on facial recognition rules set in another smart contract.

* * * * *